US008323114B2

(12) United States Patent
Burak et al.

(10) Patent No.: US 8,323,114 B2
(45) Date of Patent: Dec. 4, 2012

(54) GAMING SYSTEM HAVING MOVABLE DISPLAY DIVIDERS

(75) Inventors: Gilbert J. Q. Burak, Chicago, IL (US); Timothy C. Loose, Chicago, IL (US); Larry J. Pacey, Chicago, IL (US); Frank E. Rodriguez, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 268 days.

(21) Appl. No.: 12/681,989

(22) PCT Filed: Sep. 26, 2008

(86) PCT No.: PCT/US2008/011198
§ 371 (c)(1),
(2), (4) Date: Apr. 7, 2010

(87) PCT Pub. No.: WO2009/048512
PCT Pub. Date: Apr. 16, 2009

(65) Prior Publication Data

US 2010/0210354 A1 Aug. 19, 2010

Related U.S. Application Data

(60) Provisional application No. 61/011,825, filed on Jan. 22, 2008, provisional application No. 60/998,128, filed on Oct. 9, 2007.

(51) Int. Cl.
*A63F 13/08* (2006.01)

(52) U.S. Cl. ............ 463/46; 463/16; 463/30; 273/138.1

(58) Field of Classification Search .................... 463/16, 463/20, 25, 30, 31, 46; 273/236, 237, 138.1, 273/139, 142 A, 142 B, 142 C, 142 D, 460; 345/1.1, 31; 382/294
See application file for complete search history.

(56) References Cited

U.S. PATENT DOCUMENTS 5,435,557 A 7/1995 Coffey
5,547,232 A 8/1996 Waterman
6,059,658 A 5/2000 Mangano et al.
6,254,481 B1 7/2001 Jaffe
7,374,258 B2 5/2008 Bowron
(Continued)

FOREIGN PATENT DOCUMENTS

WO 2006000050 A1 1/2006

OTHER PUBLICATIONS

International Search Report mailed Dec. 3, 2008 for PCT/US2008/011198 (2 pages).

*Primary Examiner* — Peter DungBa Vo
*Assistant Examiner* — Damon Pierce
(74) *Attorney, Agent, or Firm* — Nixon Peabody LLP

(57) ABSTRACT

A gaming system comprises a wager input device, a display for displaying at least a portion of a wagering game, and a divider overlying the display and dividing the display into at least a first display region and a second display region. An actuator is coupled to the divider, the actuator for moving the divider relative to the display. The system includes a controller operative, in response to a triggering event, to cause the actuator to move the divider from a first position to a second position and thereby alter the size of at least the first display region.

28 Claims, 9 Drawing Sheets

U.S. PATENT DOCUMENTS

| | | | |
|---|---|---|---|
| 7,846,026 | B2 | 12/2010 | Stephenson, III et al. |
| 2002/0151360 | A1 | 10/2002 | Durham et al. |
| 2003/0157978 | A1 | 8/2003 | Englman |
| 2003/0157980 | A1 | 8/2003 | Loose et al. |
| 2004/0192430 | A1 | 9/2004 | Burak et al. |
| 2005/0003879 | A1 | 1/2005 | Jaffe et al. |
| 2005/0014547 | A1 | 1/2005 | Gomez et al. |
| 2005/0020348 | A1 | 1/2005 | Thomas et al. |
| 2005/0049028 | A1 | 3/2005 | Gornez et al. |
| 2005/0277477 | A1 | 12/2005 | Hajder et al. |
| 2006/0009286 | A1 | 1/2006 | Durham et al. |
| 2006/0063595 | A1 | 3/2006 | Kondo |
| 2006/0100014 | A1 | 5/2006 | Griswold et al. |
| 2006/0164230 | A1 | 7/2006 | DeWind et al. |
| 2006/0211494 | A1 | 9/2006 | Helfer |
| 2007/0225079 | A1 | 9/2007 | Cole |
| 2007/0252822 | A1 | 11/2007 | Kim et al. |

GAMING SYSTEM HAVING MOVABLE DISPLAY DIVIDERS

CROSS-REFERENCE TO RELATED APPLICATIONS

This application is a U.S. national stage of International Application No. PCT/US2008/011198, filed Sep. 26, 2008, which is related to and claims the benefit of U.S. Provisional Application No. 60/998,128, filed Oct. 9, 2007 and U.S. Provisional Application No. 61/011,825 filed Jan. 22, 2008, each of which are hereby incorporated by reference herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having movable display dividers.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Other gaming systems have employed various types of group displays. Some gaming devices have utilized various display technologies, such as LCD and CRT displays. Moreover, yet other gaming devices have utilized a plurality of displays to present game play and related information. The present invention is directed toward a gaming system having moveable display dividers.

SUMMARY OF THE INVENTION

According to one aspect of the present invention, gaming system comprises a wager input device, a display for displaying at least a portion of a wagering game, and a divider overlying the display and dividing the display into at least a first display region and a second display region. An actuator is coupled to the divider, the actuator for moving the divider relative to the display. The system includes a controller operative, in response to a triggering event, to cause the actuator to move the divider from a first position to a second position and thereby alter the size of at least the first display region.

According to another aspect of the invention, a method of operating a wagering game comprises receiving a wager, displaying a wagering game on a display, and dividing the display into a first display region and a second display region with a divider overlying the display. The method further comprises moving the divider from a first position to a second position to alter the size of at least the first display region.

According to yet another aspect of the invention, a gaming system comprises a wager input device, a display for displaying at least a portion of a primary wagering game, and a divider overlying the display and dividing the display into at least a first display region and a second display region. The divider is moveable relative to the display from a first position to a second position to alter the size of at least the first display region.

According to yet another aspect of the invention, a method of operating a wagering game comprises receiving a wager and displaying a wagering game on a display, the wagering game comprising a plurality of display elements. The method includes assigning a visual priority to each of the plurality of display elements and detecting movement of a divider overlying the display from a first position to a second position. The method further comprises, in response to the movement of the divider, altering the graphical display of at least one of the plurality of display elements based at least in part on the visual priorities assigned to each of the plurality of display elements.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
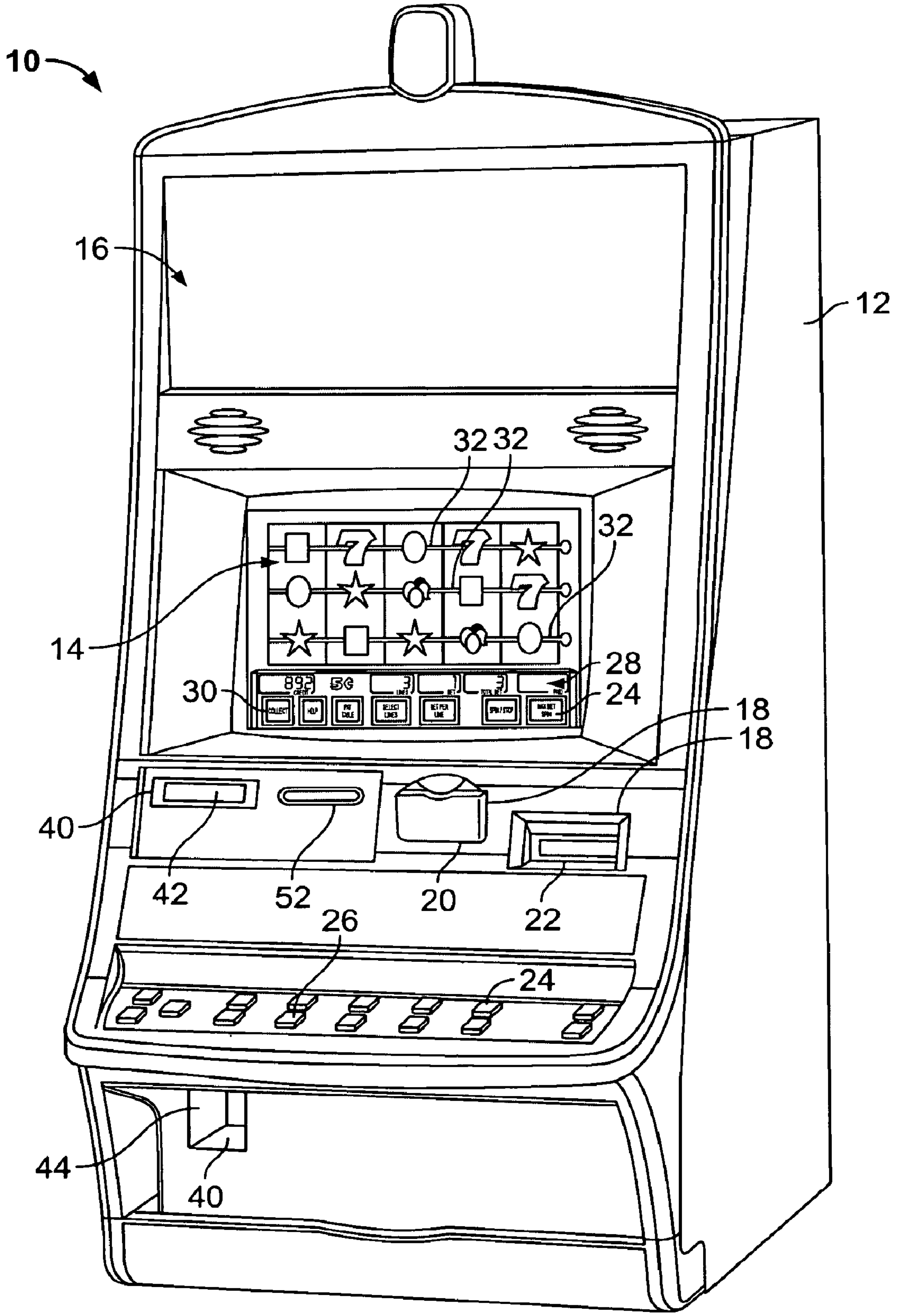
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
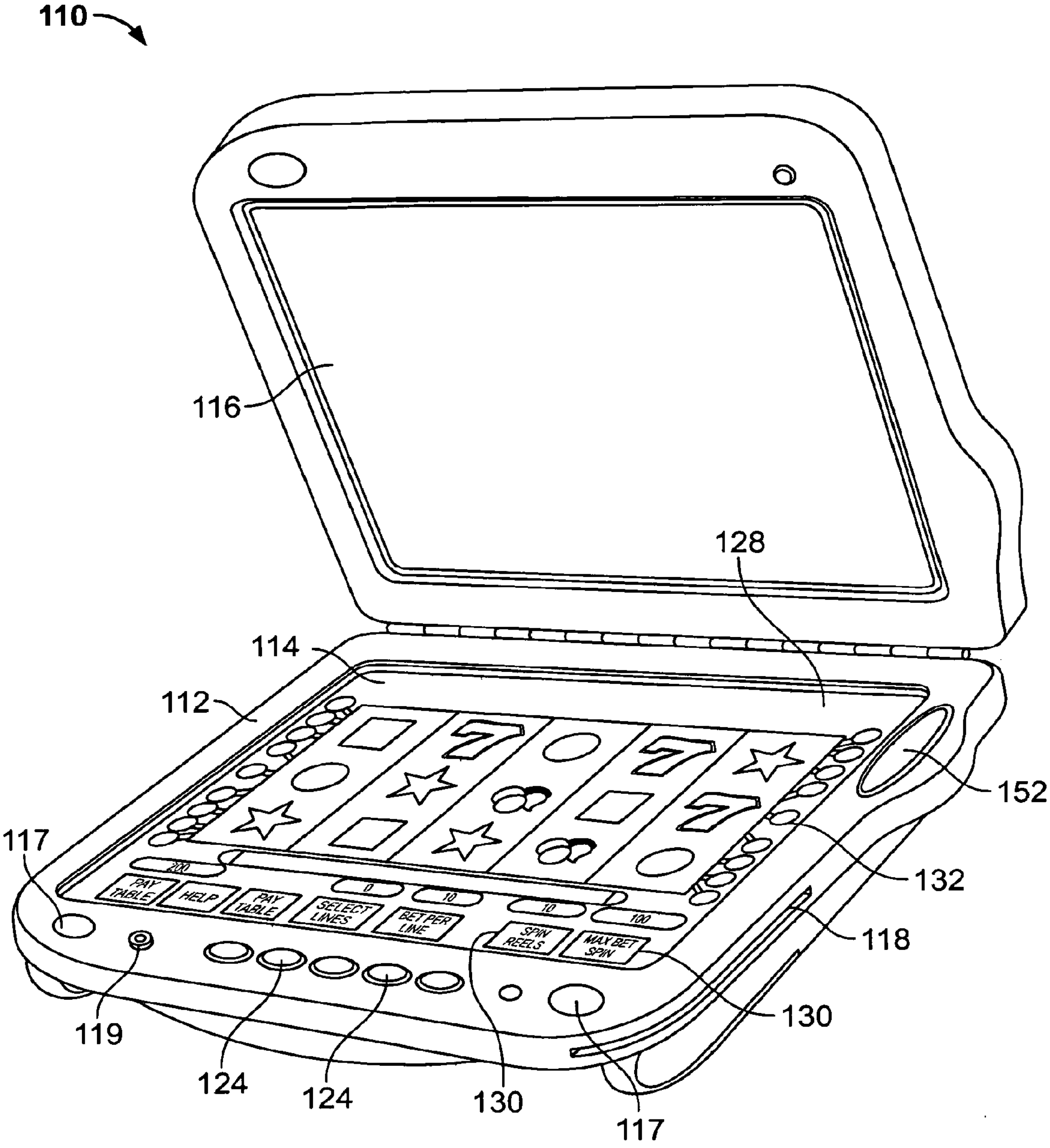
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15", 17", 22" or even larger display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
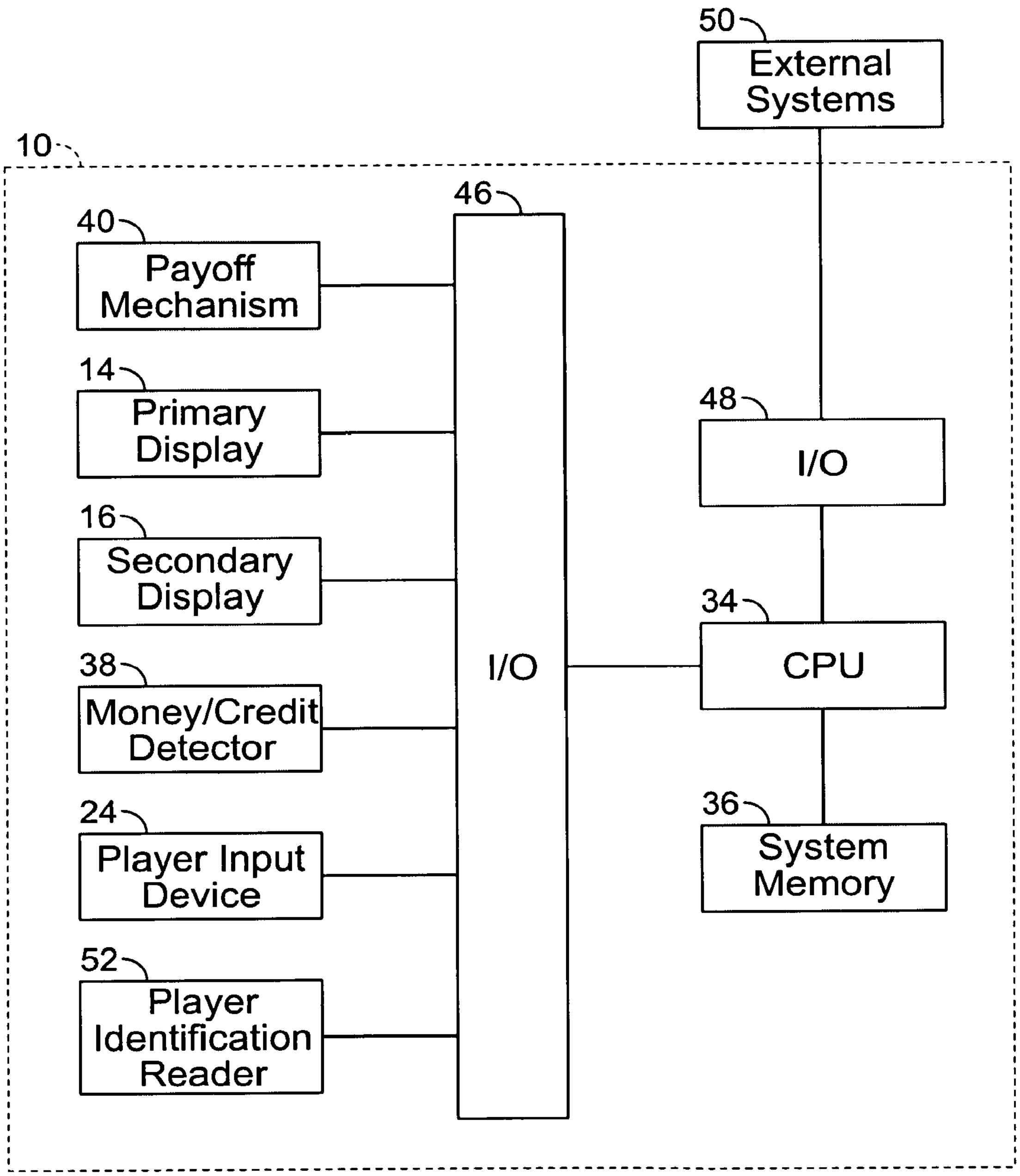
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
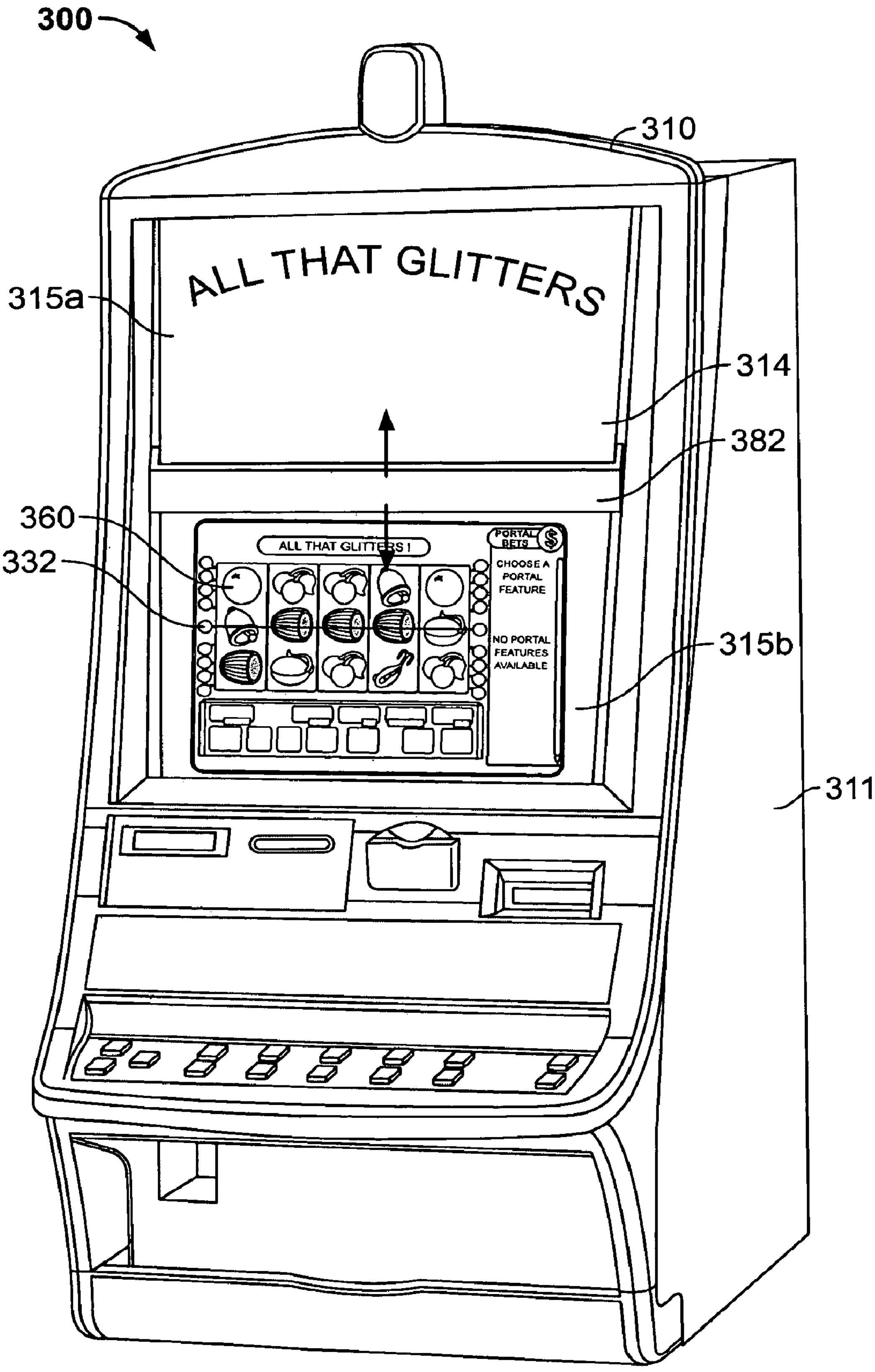
FIG. 3 is a perspective view of a gaming device having a movable display divider.

Turning now to FIG. 3, a primary display 314 of a gaming device 310 of a gaming system 300 is shown. The primary display 314 is supported in a vertical fashion and divided into two regions 315*a,b* by a moveable divider 382 overlying the display 314. The primary display 314 may be any form of display such as those described herein with reference to the free standing and handheld gaming devices of FIGS. 1*a* and 1*b*. The primary display 314 includes display of a primary wagering game 360, which in this embodiment is a slot game as shown in FIG. 3. The slot game 360 includes a plurality of reels which may be either electro-mechanical reels or simulations thereof on the primary display 314. The reels include a plurality of symbols displayed thereon which vary as the reels are spun and stopped. The symbols may include any variety of graphical symbols, elements, or representations, including symbols which are associated with one or more themes of the gaming machine or system. The symbols may also include a blank symbol, or empty space. As described herein the symbols landing on the active paylines 332 (the paylines for which a wager has been received) are evaluated for winning combinations. If a winning combination of symbols lands on an active payline 332 a primary award is awarded in accordance with a pay table of the gaming device 310. The symbols on the reels form an array or matrix of symbols, having a number of rows and columns, which in the embodiment shown is four rows and five columns. In alternate embodiments, the array may have greater or fewer symbols, and may take on a variety of different forms having greater or fewer rows and/or columns. The array may even comprise other non-rectangular forms or arrangements of symbols.

The primary display 314 shown further includes game information such as a game theme label "All That Glitters" along a top edge of the display 314. As shown in FIG. 3, in an embodiment, the primary display 314 has an aspect ratio of approximately 16:9, and takes the form of a plasma, LCD, or other flat-panel display mounted in a vertical configuration. In this mounting configuration, the long edge of the display 314 is parallel to a height of the free standing gaming device 310. The primary display 314 is connected to and supported by a housing 311 of the gaming device 310. The housing 311 may take on many forms and may include support members, frames, and other components of the housing 311 to which various elements are connected, mounted, and affixed. In an embodiment, the primary display 314 is supported by a front portion of the housing 311, so as to appear on a front side of the gaming device 310, as seen in FIG. 3.

The gaming device 310 further includes a display divider 382, which overlies the primary display 314. The divider 382 is moveable relative to the display 314. In the embodiment shown, the divider 382 may be moved, slid, or translated in a linear fashion along a vertical axis (shown by the arrows in FIG. 3). Thus, the divider 382 is moveable up and down relative to the primary display 314. In other embodiments, the divider 382 may be movable in more than one direction, and may be movable in linear and angular directions relative to the display. The divider 382 divides the visible area of the primary display 314 into two visible display regions 315*a,b*. In the embodiment shown, the first display region 315*a* displays a game theme label "All That Glitters" which is displayed on a top portion of the primary display 314. The second display region 315*b* displays the primary wagering game 360, which is displayed on a bottom portion of the primary display 314. Thus, even though all of the displayed information is transmitted by the primary display 314, the divider 382 gives the illusion of two separate displays by dividing the primary display 314 into the first and second display regions 315*a,b*.

Figure 4:
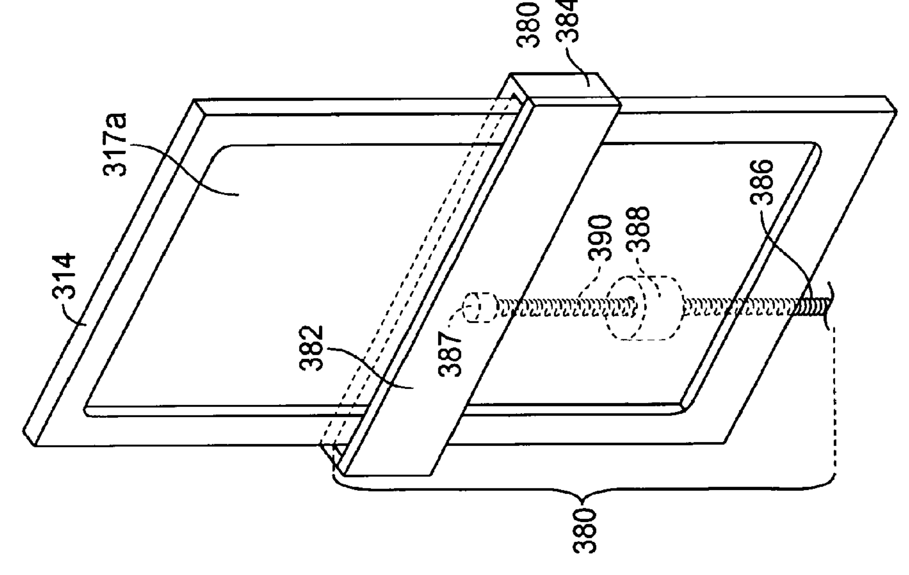
FIG. 4 is a front perspective view of a gaming device display having a movable display divider.

Turning to FIG. 4, a front perspective view of the primary display 314 and a divider assembly 380 are shown. The primary display 314 in this embodiment, as previously described, is a plasma or LCD display having an aspect ratio of approximately 16:9 and mounted in a vertical fashion such that a long edge of the display 314 is positioned vertically. Positioned in moveable relation to the display 314 is the divider assembly 380. The assembly 380 comprises a display divider 382, at least one divider support 384, and an actuator 386. In the embodiment shown, the display divider 382 is positioned generally in front of a front side 317*a* of the primary display 314, while the divider support 384 is positioned generally behind a rear side 317*b* of the display 314. The divider support 384 further wraps around the edges of the display 314 so as to be coupled to the divider 382 proximate the front side 317*a* of the display 314. In this way, the divider support 384 supports the divider 382 overlying the front side 317*a* of the display 314. The actuator 386 comprises a drive motor 388 and a drive shaft 390. In the embodiment shown, the drive motor 388 is an electric motor which rotates in response to an electrical input. The drive motor 388 is attached to the drive shaft 390 such that activation of the drive motor 388 causes the drive shaft 390 to rotate. In the embodiment shown, the drive shaft 390 includes a screw thread such that rotation of the drive shaft 390 causes the drive shaft 390 to move axially with respect to the drive motor 388. A drive nut 387 is coupled to an end of the drive shaft 390, and connected to the divider support 384 of the assembly 380.

Figure 5:
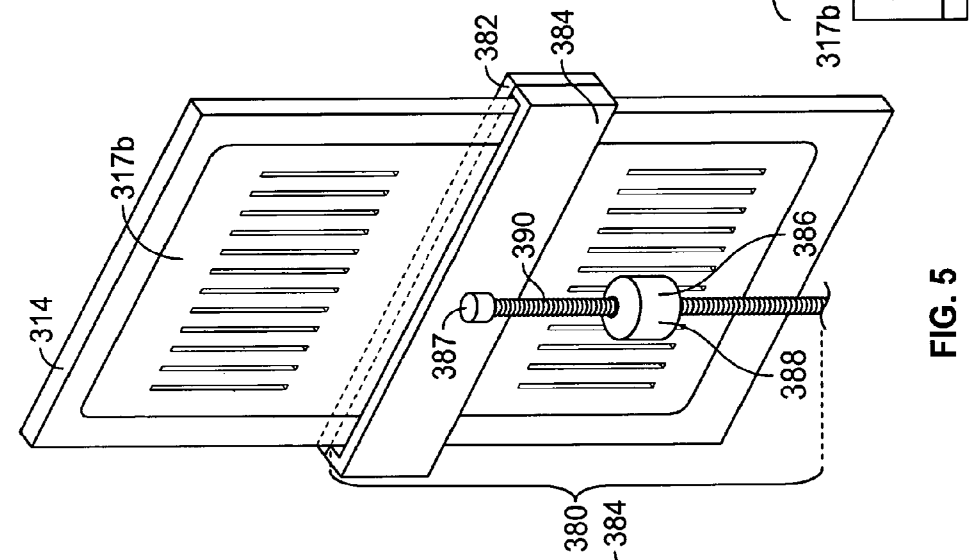
FIG. 5 is a rear perspective view of the gaming device display of FIG. 4.

Turning to FIG. 5, a rear perspective view of the primary display 314 and the divider assembly 380 is shown. The divider 382 remains overlying the front side 317*a* of the display 314, and positioned in a fashion such than an axis of the divider 382 is generally parallel to a shorter edge of the display 314. The axis of the divider 382 is further generally perpendicular to a longer edge of the display 314, which is mounted vertically. The divider assembly 380, in an embodiment, is attached to and supported by the housing 311 of the gaming device 310. More specifically, in the embodiment shown, the drive motor 388 is supported by the housing 311 and other structures attached thereto, and remains in a fixed position during operation. However, operation of the drive motor 388 causes the drive shaft 390 to rotate, which in turn causes the drive shaft 388 to move axially. One end of the drive shaft 388 (or a portion of the drive shaft) is connected to the divider support 384 via the drive nut 387 near the rear side of the display 314. Thus, axial movement of the drive shaft 390 causes the divider support 384 to move up and down in a vertical direction (in a direction parallel to the axis of the drive shaft 390). Since the divider support 384 supports the divider 382 overlying the display 314, the axial movement of the drive shaft 390 imparts movement on the part of the divider 382 in a vertical direction. Thus, rotation of the drive motor 388 in one direction causes the divider 382 to move vertically upward, while rotation of the drive motor 388 in the opposite direction causes the divider 382 to move vertically downward. Thus, the actuator 386 causes the divider 382 to move between multiple positions.

In other embodiments, the drive shaft 390 may extend through the drive nut 387 and be longer than shown in the FIGURES. Moreover, in yet other embodiments, the drive motor 388 may be located in other positions along the drive shaft 390 (for example at one end of the drive shaft 390). In yet other embodiments, the drive shaft 390 may remain in a fixed position axially, and pass through the drive nut 387, such that rotation of the drive shaft 390 causes the drive nut 387 and divider support 384 to move axially up and down along the drive shaft 390.

Figure 6:
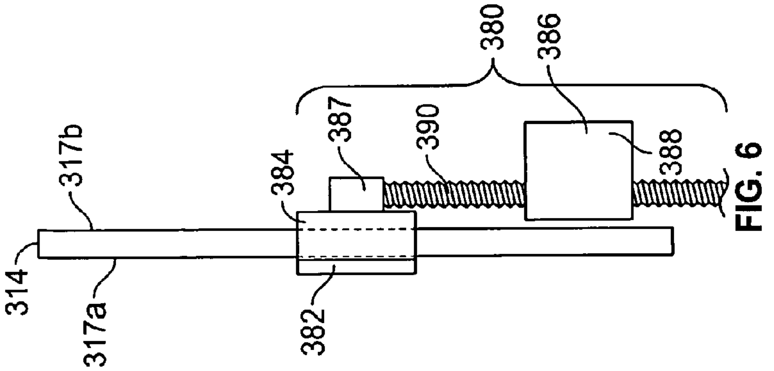
FIG. 6 is a left end view of the gaming device display of FIG. 4.

Turning to FIG. 6, a side view of the primary display 314 and divider assembly 380 of FIGS. 4 and 5 is shown. The divider support 384 is shown extending from behind the display 314, and wrapping around the edges of the display 314 to support the divider 382 in a position in front of (or overlying) the display 314. The actuator 386 is positioned behind the display 314. The actuator 386, in alternative embodiments, may be positioned elsewhere relative to the display 314. For example, the actuator 386 may be located above the display 314, below the display 314, or even in front of the display 314 (or any combination thereof). The drive motor 388 is supported by and connected to the housing 311 so as to be stationary during operation. The drive shaft 390 rotates under power of the drive motor 388, causing to move axially as shown by the arrows. The drive shaft 390 may be shorter or longer than shown in the FIGURES, and may also be connected to the divider support 384 at any point along its length, including an end of the drive shaft 390.

Figure 7:
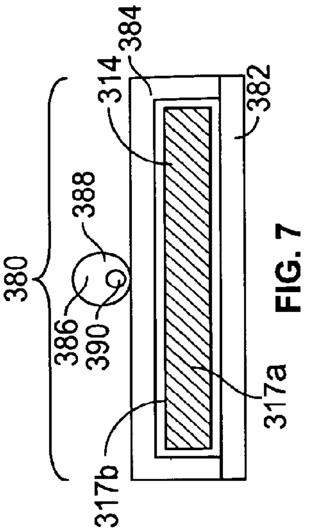
FIG. 7 is a top end view of the gaming device display of FIG. 4.

Turning to FIG. 7, a top view of the primary display 314 and divider assembly 380 of FIGS. 4-6 is shown. The divider support 384 is shown extending from behind the display 314, and wrapping around the edges of the display 314 to support the divider 382 in a position in front of (or overlying) the display 314. The actuator 386 is positioned so as to be connected to a point generally centered along a length of the divider support 384. The divider 382 is shown extending beyond the edges of the display 314 so as to be connected to a portion of the divider support 384.

Figure 8:
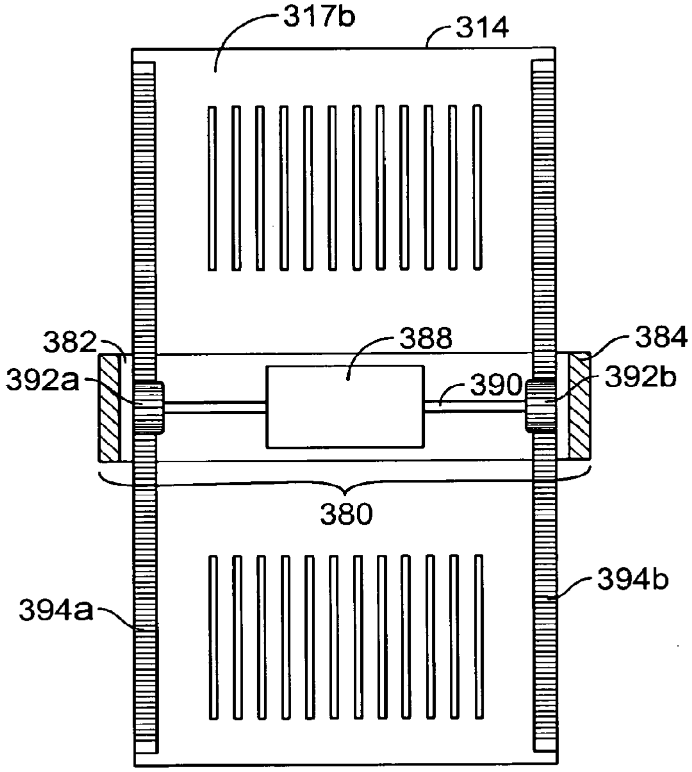
FIG. 8 is a rear view of an alternative embodiment of a gaming device display having a movable display divider.
Figure 9:
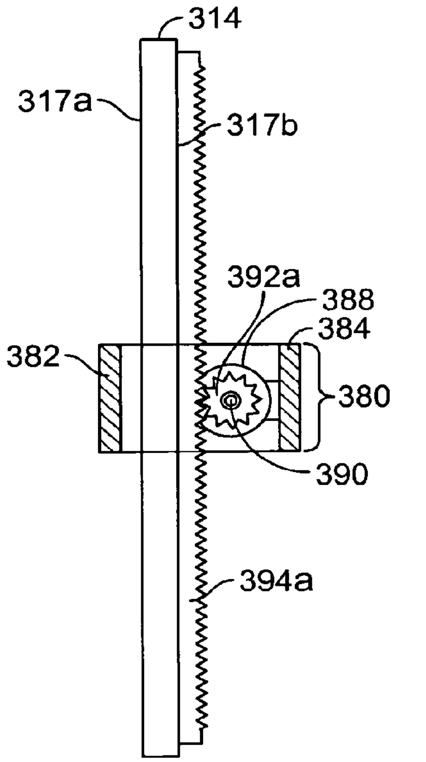
FIG. 9 is a side view of the gaming device display of FIG. 8.
Figure 10:
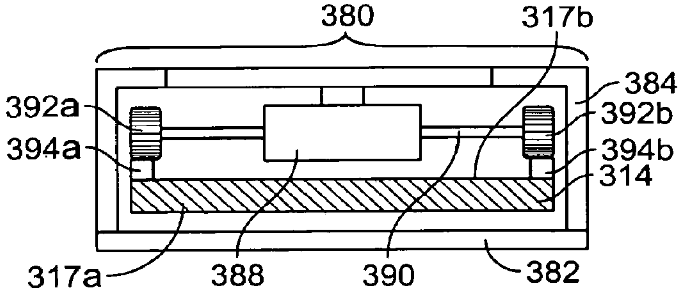
FIG. 10 is a top view of the gaming device display of FIG. 8.

An alternative embodiment of a primary display 314 and divider assembly 380 are shown in FIGS. 8-10. In FIG. 8, a rear view of the display 314 is shown. Behind the display 314 is a divider support 384 that is connected to an actuator 386. The divider support 384 supports a movable divider 382. As before, the divider 382 is proximate a front side 317*a* of the display 314 while the divider support 384 is proximate a rear side 317*b* of the display 314. The actuator 386 comprises a drive motor 388, a drive shaft 390, two drive gears 392*a,b*, and two drive tracks 394*a,b*. In an embodiment, the drive motor 388 is an electric motor which rotates power the drive shaft 390. The drive shaft 390 in turn rotates to impart rotation upon the drive gears 392*a,b*. The drive gears 392*a,b* and the drive tracks 394*a,b* comprise a rack and pinion system whereby the drive gears 392*a,b* ride along the drive tracks 394*a,b* as they rotate. Thus, rotation of the drive gears 392*a,b* causes the drive motor 388 and drive shaft 390 to move linearly along a long axis of the display 314. Because the divider support 384 and divider 382 are coupled to the actuator 386, rotation of the drive motor 388 in causes the divider 382 to move linearly parallel to the drive tracks 394*a,b*. Thus, activation of the actuator 386 causes the divider 382 to move axially parallel to a long edge (or long axis) of the primary display 314, which in this embodiment is up and down given the vertical orientation of the display 314.

In FIG. 9, a side view of the display 314 and divider assembly 380 is shown. The drive track 394 comprises a rack gear which is mounted axially along a long edge of the display 314 (on the rear of the display 314). In the embodiment shown, the drive track 394 is mounted on a rear surface of the display 314. In alternative embodiments, the drive tracks 394*a,b* may be mounted on the housing 311 of the gaming device 310, or connected to other support structures of the gaming device 310. In yet other embodiments, a track or groove may be used in place of rack gear, and the drive gears 392*a,b* may be replaced by a drive wheel or belt. As shown in FIG. 9, the drive tracks 394*a,b* extends substantially the entire length of the display 314 to allow the divider 382 to traverse the entire display 314. In other embodiments, shorter or longer drive tracks 394*a,b* may be utilized to appropriately adjust the range of travel of the divider assembly 380 and divider 382. Moreover, fewer or more drive tracks 394 and drive gears 392 may be used in other embodiments. In FIG. 10, a top view of the display and divider assembly 380 is shown. The actuator 386 may be configured as shown, such that the drive motor 388 is positioned between the divider support 384 and a rear surface of the display 314. However, in alternative embodiments, the drive motor 388 may be positioned in any number of locations so as to activate the drive gears 392*a,b*. In one alternative embodiment, each of the drive gears 392*a,b* may be actuated by individual drive motors positioned proximate thereto, and the drive shaft 390 may be eliminated.

Figure 11:
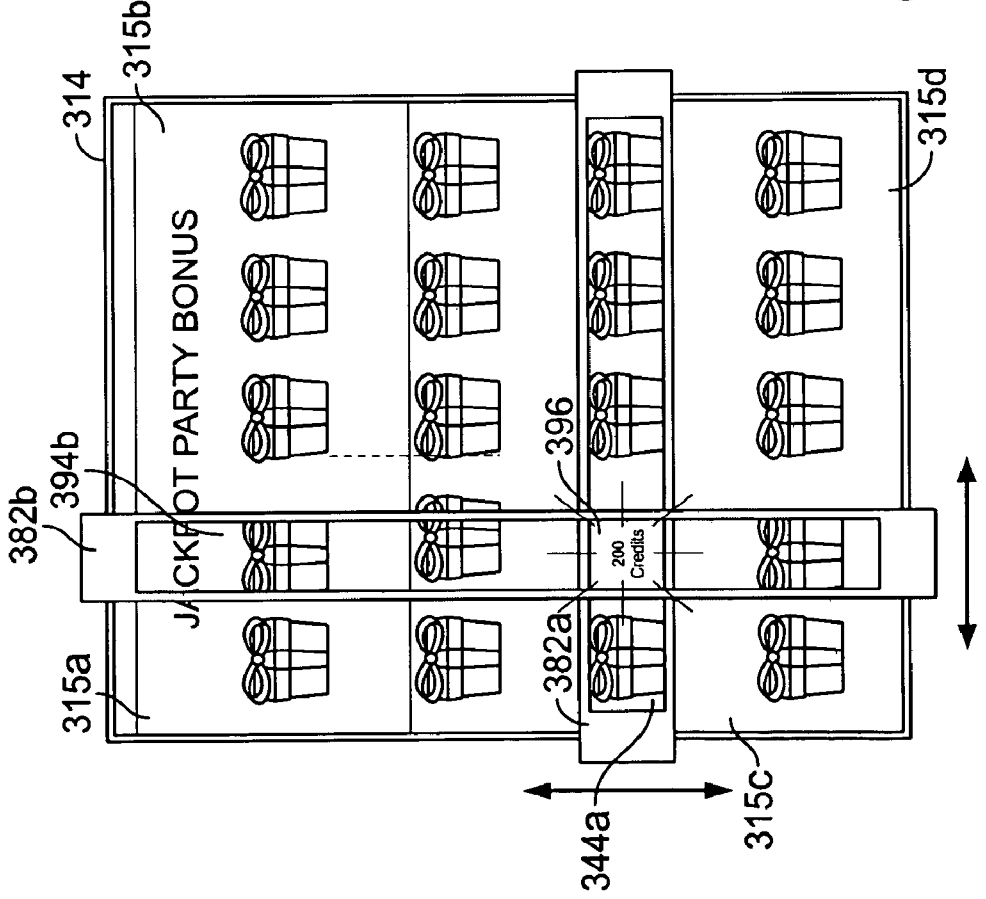
FIG. 11 is a front view of another alternative embodiment of a gaming device display having a plurality of movable display dividers.

Turning to FIG. 11, a front view of an alternative embodiment of a primary display 314 is shown in which a plurality of dividers 382*a,b* is utilized. A first divider 382*a* is mounted horizontally across a shorter dimension of the display 314 while a second divider 382*b* is mounted vertically across a longer dimension of the display 314. The first divider 382*a* travels vertically up and down, along an axis parallel to a long edge of the display 314. Similarly, the second divider 382*b* travels horizontally left and right, along an axis parallel to a short edge of the display 314. Thus, the two dividers 382*a,b* work in concert so as to divide the primary display 314 into a plurality of display regions 315*a,b,c,d*. The regions 315*a,b, c,d* may be of the same or similar size, or may be of completely different sizes.

Each of the dividers 382*a,b* includes a viewing window 394*a,b* therein, which is transparent or translucent so as to allow portions of the display 314 behind the viewing window

394*a,b* to be visible through the divider 382*a,b*. Thus, the viewing window 394*a* on the first divider 382*a* permits an entire row of symbols of the primary wagering game 360 displayed on the display 314 to be seen. Similarly, the viewing window 394*b* on the second divider 382*b* permits an entire column of symbols of the primary wagering game 360 displayed on the display 314 to be seen. Moreover, working in concert, the two viewing windows 394*a,b* overlap to create a pointing window 396. The pointing window 396 occurs proximate the intersection of the two dividers 382*a,b* and the viewing windows 394*a,b* thereon. The pointing window 396 creates a mechanism by which the two dividers 382*a,b* may be used to identify, point to, or indicate a certain location on the primary display 314. In this way, the pointing window 396 acts like crosshairs on a target sight. As seen in FIG. 11, the pointing window 396 is used to indicate the result of a player's selection of a particular selectable element on the primary display 314, and the award associated therewith is revealed (200 credits). In other embodiments, the pointing window 396 may be used to indicate, point to, or highlight many other features, symbols, or areas of the display 314 screen.

Figure 12:
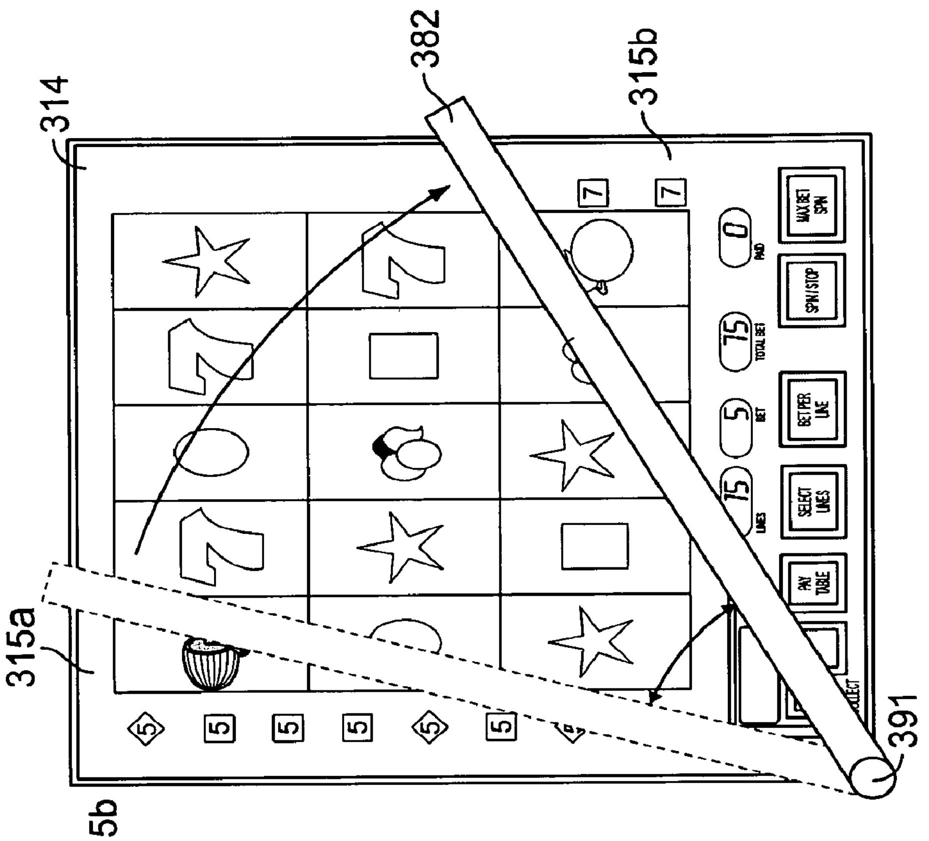
FIG. 12 is a front view of yet another alternative embodiment of a gaming device display having a movable display divider.

Turning to FIG. 12, a front view of yet another alternative embodiment of a primary display 314 and divider 382 is shown. The divider 382 is moveable or rotatable about a pivot point 391, which in the embodiment shown is proximate a lower left hand corner of the primary display 314. An actuator (not shown) causes the pivot point 391 to rotate, thereby causing the divider 382 to rotate from a first position (dotted line) to a second position (solid line). As the divider 382 is rotated or moved from the first position to the second position, the display regions 315*a,b* formed by the divider 382 change in size. A first display region 315*a* is increased as the divider 382 moves from the first position to the second position. Moreover, a second display region 315*b* is decreased as the divider 382 moves from the first position to the second position. In alternative embodiments, the pivot point 391 about which the divider 382 is rotated may be located in other places in the plane formed by the visible area of the display 314. Thus, for example, a pivot point mounted in the center of a square display may be used to rotate a divider ninety (90) degrees, such that the divider goes from dividing the screen of the display 314 vertically to horizontally. Other configurations are possible as well.

Figure 13B:
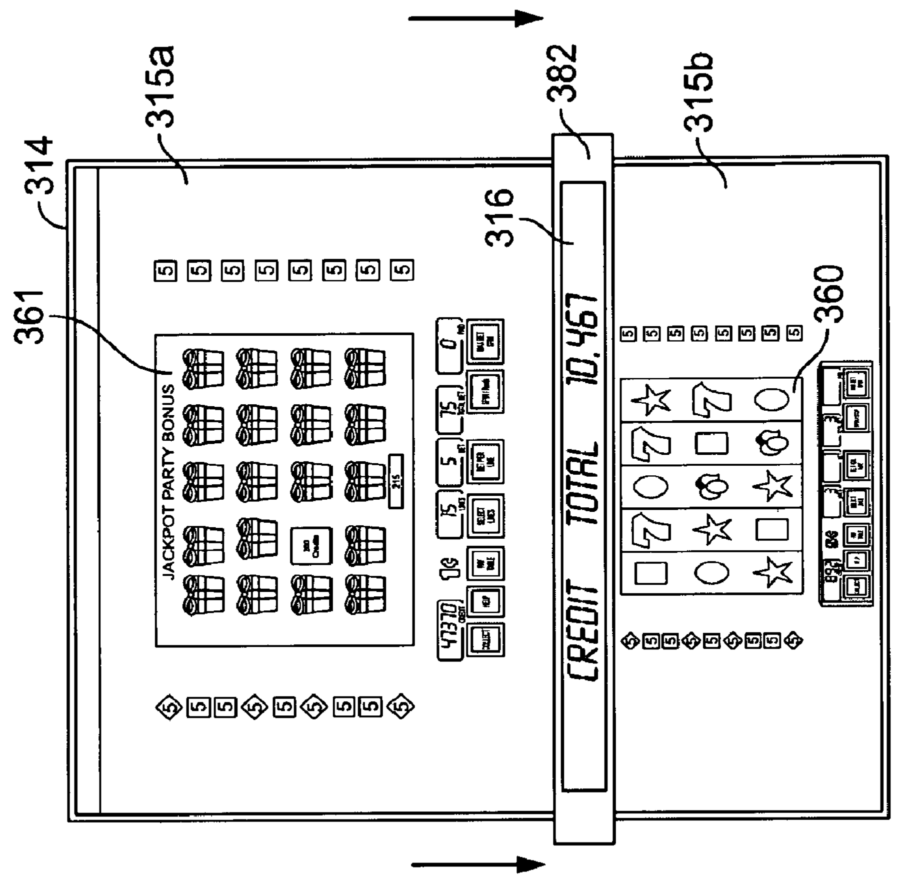
FIG. 13B is a front view of the gaming device display of FIG. 13A with the divider moved to a second position.
Figure 13A:
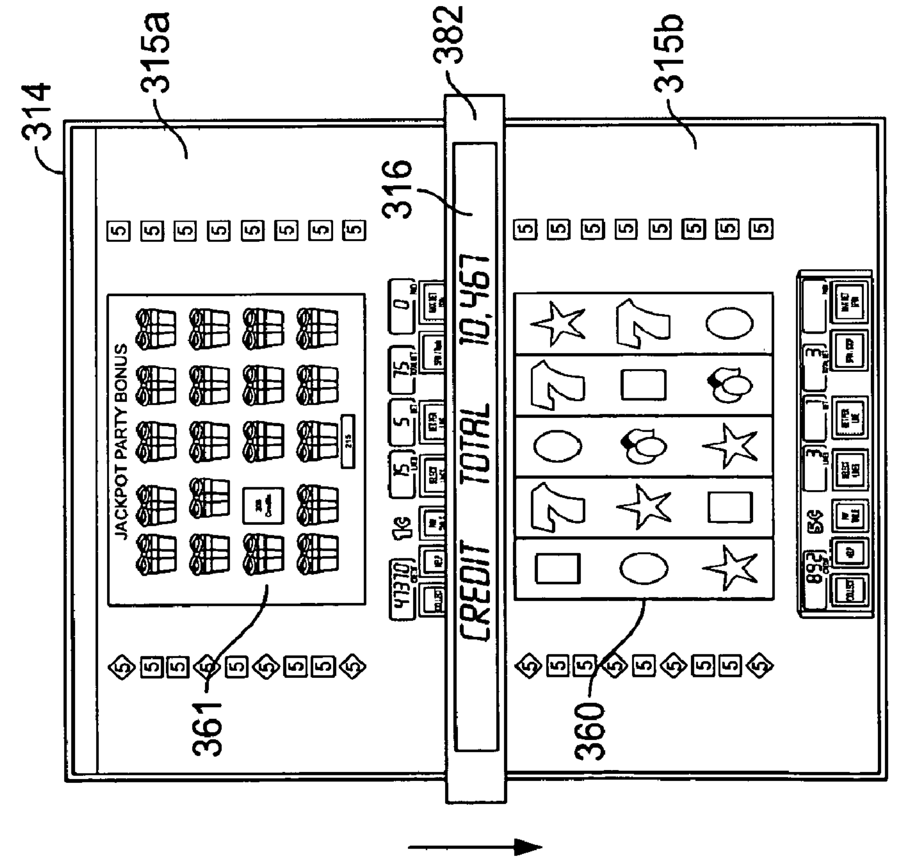
FIG. 13A is a front view of yet another alternative embodiment of a gaming device display having a moveable display divider.

Turning to FIGS. 13A and 13B, a front view of yet another alternative embodiment of a primary display 314 and divider 382 is depicted. As with other embodiments, the divider 382 overlies and divides the viewable area of the primary display 314 into a plurality of regions. Here, the divider 382 causes the display 314 to be divided into a first display region 315*a* and a second display region 315*b*. The primary display 314 displays a primary wagering game 360 in the first display region 315*a* and a bonus game 361 in the second display region 315*b*. During play of the primary wagering game 360 shown in FIG. 13A, the divider 382 is positioned such that the primary display 314 is divided approximately in half. In this way, the first and second display regions 315*a,b* are of approximately equal sizes. Upon the occurrence of a triggering event (for example the commencement of the bonus game 361), the divider 382 is moved from a first position (FIG. 13A) to a second position (FIG. 13B). This causes the first display region 315*a* to increase in size and the second display region 315*b* to decrease in size. The activated bonus game 361 is resized (enlarged) to fill the resized first display region 315*a*. Similarly, the deactivated primary wagering game 360 is resized (reduced) to fill the resized second display region 315*b*. In this way, the divider 382 is used to resize the relative display regions 315*a,b* so as to make activated features on the display 314 more prominent (use more real estate of the display 314 to display more important features), and to make deactivated features on the display 314 less prominent (use less real estate of the display 314 for less important features).

In addition, the divider 382 includes a secondary display 316 thereon. In the embodiment shown in FIGS. 13A and 13B, the secondary display 316 is an LCD display which shows a Credit Total Balance thereon. However, in alternative embodiments, the secondary display 316 may take on many other forms, and display many other varieties of information. For example, the secondary display 316 may be an LED display, an LCD display, a transmissive LCD display, etc. Moreover, the divider 382 may feature labels, stickers, art, writing, numbers, or other information thereon.

Figure 14:
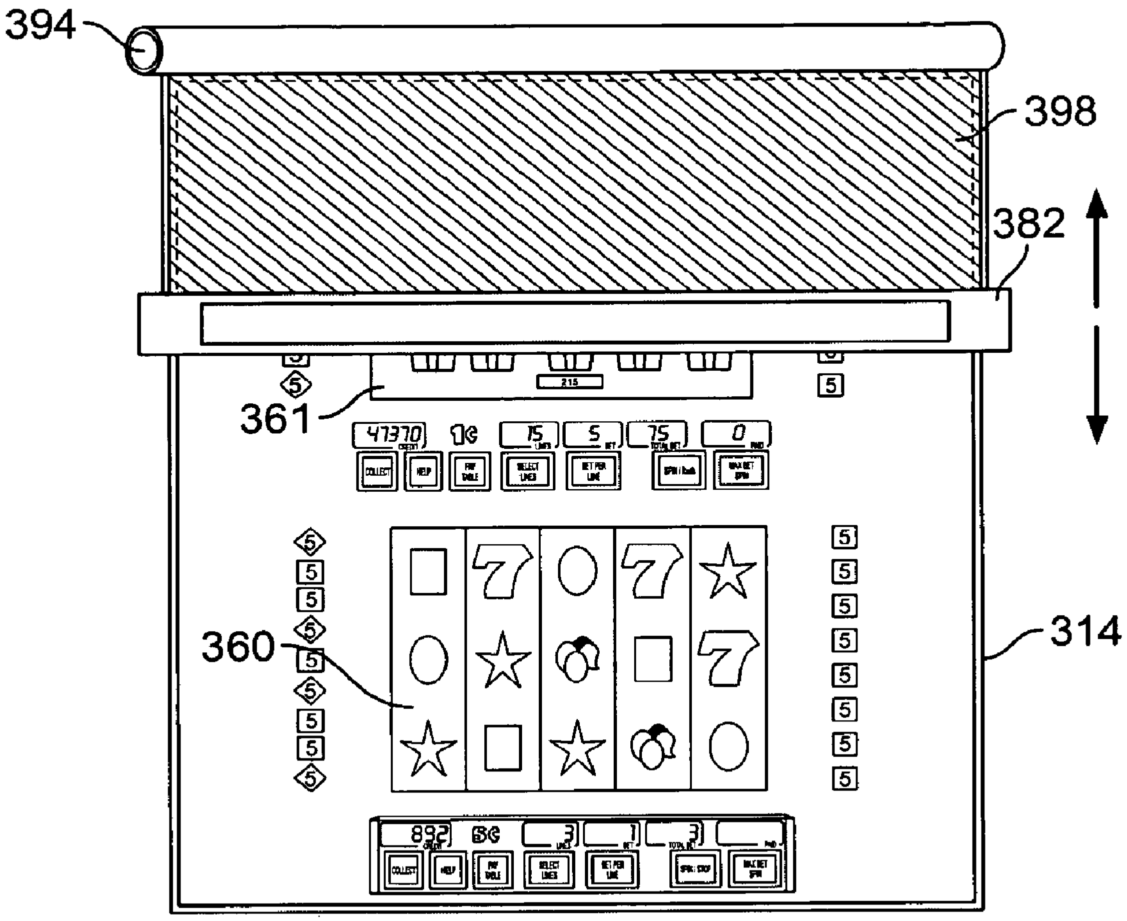
FIG. 14 is a front view of yet another alternative embodiment of a gaming device display having a movable display divider.

In FIG. 14, a front view of yet another embodiment of a primary display 314 and divider 382 are shown. Again the divider 382 overlies the display 314 and moves relative to the display 314 along a long axis of the display 314 (in the direction of the arrows shown). The divider 382 is coupled to a shade 398, which in this embodiment is an opaque fabric material. The shade 398, like a window shade, is used to cover or block view of a portion of the primary display 314. The shade 398 is coiled around a spring loaded spool 399, so as to be extended and recoiled as the divider 382 moves. Thus, as the divider 382 is actuated by the actuator to move down, the shade 388 is uncoiled and extended to cover a top portion of the primary display 314. Similarly, as the divider 382 is actuated to move up, the shade 388 is recoiled by the spring loaded spool 399 and a top portion of the primary display 314 is revealed or uncovered as the divider 382 moves. In alternative embodiments, the shade 388 may be translucent or transparent. Moreover, the shade 388 may include a number of cutouts or translucent portions, while remaining generally opaque. The shade 388 may be constructed of any number of suitable materials, The systems 300 shown in the FIGURES may further include one or more sensors to determine the position of the divider 382, divider support 384 and/or divider assembly 380 to assist in controlling and positioning the same. In one embodiment, the control system and sensors may include one or more encoders on the drive motor 388 which relay the position of the motor and divider assembly 380 to a controller. In another embodiment, position limit switches may be appropriately located, for example, along the drive tracks 394*a,b* to sense the position of the divider 382 and relay the same back to a controller. In other embodiments, predefined position markers, such as flags, may be located along the path of travel of the divider 382 and divider assembly 380, such that a control system can locate and control the divider 382 based upon the number of position markers that the divider 382 has passed. In other embodiments, other sensors may be used to locate and control the position of the divider 382, such as optical sensors, optical interrupters, photo eye sensors, and wireless sensors (such as blue tooth, infrared, etc.). In another embodiment, a touch screen overlying the primary display 314 may be capable of sensing physical touches, or objects within a certain short distance proximity to the primary display 314 (even though not actually touching the surface of the display 314). Such a touch screen device could be configured to sense and report positions and locations of the divider 382 overlying the display 314, provided that the divider 382 was positioned to operate within the range of sensing capabilities of the touch screen.

In alternative embodiments, the primary display 314 as well any secondary displays 316 may take on many other forms. The displays 314,316 could be LCD displays, plasma displays, LED displays, OLED displays, or even mechanical presentations, such as mechanical or electromechanical reels, for example. The displays 314,316 may take on a variety of shapes, sizes, configurations, or aspect ratios. Moreover, the divider 382 overlying the display 314 may be positioned in a number of ways, including vertically, horizontally, or at an angle. The divider 382 may be actuated by the divider assembly 380 to move in a variety of ways, as well. For example, the divider 382 may move in a linear fashion, an angular fashion, or a curvilinear fashion. In other embodiments, the divider 382 may be actuated in multiple directions or fashions at once. In the embodiments shown, the divider 382 is supported by and connected to the primary display 314. However, in other embodiments, the divider 382 may be supported by the housing 311 of the gaming device 310, or by other structures attached thereto.

In alternative embodiments, the divider assembly 380 and the actuator 386 may take on a large variety of forms and mechanisms for moving the divider 382. The actuator may be an electric linear actuator, a linear motor, a hydraulic cylinder, a pneumatic cylinder, an electric motor, an electric cylinder, or a magnetic actuator. A series of pulleys which drive cables and/or belts may be used to actuate the divider. Moreover, a combination of mechanical systems may be used in conjunction with one another to actuate the divider overlying the primary display. A variety of tracks, grooves, sleds, rails, bearings, wheels, and other devices may be used in conjunction with the actuator to support the divider and assist in making movement easier and reducing friction.

In yet other alternative embodiments, the divider 382 itself may take on various forms. The divider 382 may be a relatively thin and light plastic bar overlying the display. The bar may be straight, curved, smooth or textured. Moreover, the divider 382 may take on a large variety of shapes. The divider 382 may support other devices, decorations, or elements mounted thereto. For example, bezel lights, LEDs, graphics, stickers, or other items may be mounted to the divider 382 to add visual appeal and to generate attention to the divider 382 at certain times during display of wagering game events. The divider 382 may be decorated to correspond to a theme of gaming device or gaming system. Moreover, in addition to dividing the display into various regions, the divider may be used as an indicator. Thus, the divider can point to, emphasize, highlight or indicate various elements of wagering game, including outcomes of the wagering game. In yet other alternative embodiments, the divider may be capable of manual movement and be coupled to one or more sensors so as to serve as an input device. Thus, a player of the gaming device may physically move the divider to a desired location. The location of the divider may be sensed and located by appropriate sensing and control equipment, which in turn can generate an input signal related to a location of the divider. For example, a player may select an appropriate payline by locating a translucent divider over the row of symbols which he or she desires to select. Other configurations are possible as well.

In an alternative embodiment, the divider is capable of being moved from one position to another by manual manipulation as well as by actuation by an actuator, such as the drive motor described herein. For example, the configuration shown in FIGS. 13A and 13B may be used to allow a player to slide the divider 382 along one or more axes of the primary display 314. One or more sensors, as described herein, may be used to detect the position of the divider 382, such that the player may slide the divider 382 so that it can be used as an input device. The graphics displayed on the primary display 314 may be coordinated to respond to, interact with, or be affected by the position of the divider 382. In one example, the various visual elements displayed graphically on the primary display 314 may be assigned various weightings or importance levels which are evaluated by one or more rule sets to determine where and how the graphical elements are displayed, if at all, relative to the position and placement of the divider 382.

For example, in FIGS. 13A and 13B, the secondary wagering game 361 and primary wagering game 360 may be assigned relative weighting which is evaluated by a rule set based upon the location of the divider 382. As the divider 382 is moved, the primary and secondary wagering game 360,361 may be moved, resized, rotated, relocated, or eliminated from the display 314. Similarly, in another example, a button panel may be displayed along a bottom portion 315*b* of the primary display 314, and inputs thereto may be received by a touch screen overlying the primary display 314. As the divider 382 is repositioned (for example from the middle of the primary display 314 downwards to decrease the size of the display area 315*b* available for the button panel), the buttons may be resized, rearranged, changed, or eliminated. As the display area 315*b* for the button panel decreases, the buttons may be rearranged, for example from a 4×5 array of buttons (20 buttons) to a 2×10 array and then a 1×20 array to more appropriately fit in the decreased display area 315*b*. As the display area 315*b* is further decreased, the buttons may be changed to a different user interface, for example to five buttons (instead of 20), with each of the five buttons having a scroll bar, pull down menu or dial which can be activated to display the hidden additional button selections. Many other configurations are possible as well.

In another example, game play of either or both of the primary or secondary wagering games 360,361 may be affected by the location of the divider 382, and its use as an input device. For example, in a pinball type game, a ball bouncing around the screen may "perceive" the location of the divider 382 as a "wall" and bounce off of the virtual wall created by the divider 382. By moving the divider 382, a player may be permitted to increase or decrease the size of a playing field in which the ball bounces. Moreover, by quickly or slowly moving the divider 382 as it impacts the ball, the divider 382 may be used as an input device to impart greater acceleration or speed to the ball, or to slow it down. Thus, the divider 382 may interact with graphical objects displayed on the underlying primary display 314 in a coordinated manner to present a graphical display or illusion that the divider 382 is physically interacting with such objects. The interaction may be animated, exaggerated, or performed to appear as a natural physical result.

In other alternative embodiments, the divider 382 may include mechanical or electro mechanical buttons, or a touch screen for receiving inputs thereon. The buttons, for example, could be covered with a soft rubber membrane which deflects upon being pressed, thereby allowing the buttons to give the user or player a tactile sensation while activating them. The buttons on the divider 382 may be labeled, or may be "soft buttons" having dynamic text, graphics, or labels associated therewith for being able to change the button functions from time to time. In one embodiment, the divider 382 may be transparent or translucent such that the underlying display 314 may project and display the text, graphics, or labels associated with the buttons on the divider 382. Thus, as the divider 382 is moved or repositioned, the display 314 may reposition the associated button graphics, text, or labels so that they remain visually associated or proximate to the relevant buttons. Thus, for example, one of the electromechanical buttons may be a "Spin" button which activates a play of the primary wagering game 360. The word "Spin" may be displayed (along with optional graphics, animation, or other designs) on the primary display 314 proximate to or in visual association with the button which activates the play of the game. When the divider 382 is repositioned by a player, the primary display 314 may move the "Spin" text to the new location of the divider 382 so that it continues to provide an appropriate label for the button. In doing so, the primary display 314 may receive and utilize a location of the divider 382 as reported by various sensors.

In another embodiment, the divider 382 may be switched between an active or passive state, or changed between an input and output mode. While in an input mode, the divider 382 may be permitted to be moved or repositioned by a player or other user of the gaming device. While in an output mode, the divider 382 may only be actuated by an associated actuator, such as the drive motors discussed herein. In some embodiments, the divider 382 may be capable of being both manually repositionable and actuated by an actuator at the same time. In yet other embodiments, the divider 382 may be locked down to a particular location so that it cannot be moved or actuated until released.

In yet other embodiments, the divider 382 may be used to change content on the screen of the primary display 314. For example, in FIGS. 13A and 13B, as the divider 382 is repositioned or slid across the display, the first display area 315*a* may appear to slide onto the display 314 from the top edge, while the second display area 315*b* slides "off" of the display 314 along the bottom edge. Thus, by sliding the divider 382 from one edge of the display 314 to another, the graphics on the display 314 are changed in a coordinated manner to give the illusion that graphics are being pushed off of the display 314 in favor of other graphics which are being dragged onto the display 314. In one embodiment, the divider 382 may be used to create a split screen scenario, for example, for two players to play simultaneously on one gaming device, or one display 314. In other embodiments, less frequently used options or preferences may be stored "off screen" and dragged onto the screen by moving the divider 382 from an edge of the display 314 as if opening a visual "drawer" containing the additional selectable inputs.

Moreover, the content stored off screen and dragged onto the screen by actuation of the divider 382 may be specific to the person utilizing the device. For example, a player may be recognized by a player identifier, such as a player tracking card, and thus when such player actuates the divider 382, a set of play preferences or secondary wagering games which the player prefers may appear. On the other hand, when a maintenance person or field technician who repairs or maintains the gaming device is recognized by an employee identification card, for example, the visual options or menu which appears when the divider 382 is actuated may include maintenance and configuration selections. Thus, various configurations may be used, stored and recalled on servers accessible to the gaming device over a network such that the content which is displayed upon actuation of the divider 382 is unique or customizable depending on the user of the device. The divider 382 may also drag onto the screen a plurality of supplemental features, portal games, or other wagering activities in which the player can actively or passively participate while playing the primary wagering game 360. The supplemental features may or may not require additional side wagers.

In yet another embodiment, the divider 382 may signal to the player or operator if it requires repositioning or actuation. For example, lights or a video display on the divider 382 (or elsewhere on the device, such as on the primary display 314) may signal a player to move the divider 382 to a desired location. In one example, a bonus game may require that the divider 382 be placed in a predetermined position on the primary display 314. Lights on the divider 382 and/or graphics on the underlying primary display 314 may communicate to the player the need for the divider 382 to be moved. Moreover, the lights and graphical display may instruct the player as to the direction, distance, speed, etc. in which the divider 382 must be moved. Other lights or graphics may indicate the location to which the divider 382 must be moved so that the player may properly align the divider 382 with the necessary location. Audio prompts, music, graphics and animation may be used to assist in informing the player of the need to relocate the divider 382.

The systems, devices and methods described herein offer a number of benefits and advantages over traditional gaming systems. The divider of the present system allows a primary display to be subdivided to create multiple display regions without the need for additional displays to be utilized. Moreover, because the divider is moveable, the display regions can be changed and customized, which creates an advantage over using multiple fixed-size displays. The movable divider may be used to maximize efficient use of display real estate so as to emphasize certain gaming events. For example, during play of a bonus game the display region displaying the bonus event may be enlarged while a less important display region (such as an inactive primary wagering game) may be reduced in size. In this way, the variations in sizes and configurations of display regions causes the primary display to be fully utilized. Other benefits are provided as well.

Each of these embodiments and obvious variations thereof is contemplated as falling within the spirit and scope of the claimed invention, which is set forth in the following claims.

What is claimed is:

1. A gaming system comprising:

a wager input device;

a display for displaying at least a portion of a wagering game;

a divider overlying the display and dividing the display into at least a first display region for displaying a first aspect of the wagering game and a second display region for displaying a second aspect of the wagering game;

an actuator coupled to the divider, the actuator configured to move the divider relative to the display independent of direct manual manipulation of the divider by a user; and a controller operative, in response to a gaming-related triggering event, to cause the actuator to move the divider from a first position to a second position and thereby alter the size of at least the first display region.

2. The system of claim 1, wherein as the divider moves from the first position to the second position, the relative sizes of the first and second display regions are altered such that the size of one of the first and second display regions increases and the size of the other of the first and second display regions decreases.

3. The system of claim 1, wherein an axis of the divider is generally perpendicular to a length of the display.

4. The system of claim 1, wherein the actuator moves the divider in a linear fashion from the first position to the second position.

5. The system of claim 1, wherein the actuator moves the divider in an angular fashion from the first position to the second position.

6. The system of claim 1, further comprising at least one sensor for detecting a location of the divider as it moves between the first and second positions.

7. The system of claim 6, wherein the controller is further operative to move the divider based upon the location detected by the at least one sensor.

8. The gaming system of claim 1, wherein the gaming-related triggering event is a commencement of a bonus game.

9. A method of operating a wagering game comprising:
receiving a wager;
displaying a wagering game on a display;
dividing the display into a first display region and a second display region with a divider overlying the display, the first display region for displaying a first aspect of the wagering game and the second display region for displaying a second aspect of the wagering game; and
in response to a gaming event, moving the divider independent of direct manual manipulation of the divider by a user from a first position to a second position via an actuator coupled to the divider, thereby altering the size of at least the first display region.

10. The method of claim 9, wherein moving the divider from the first position to the second position causes the relative sizes of the first and second display regions to be altered such that the size of one of the first and second display regions increases and the size of the other of the first and second display regions decreases.

11. The method of claim 9, further comprising sensing a location of the divider as it moves from the first position to the second position.

12. The method of claim 11, further comprising, in response to the sensing, evaluating the location of the divider relative to the second position.

13. A gaming system comprising:
a wager input device;
a display for displaying at least a portion of a wagering game;
a divider overlying the display and dividing the display into at least a first display region for displaying a first aspect of the wagering game and a second display region for displaying a second aspect of the wagering game;
an actuator, coupled to the divider, configured in response to a gaming event to move the divider relative to the display from a first position to a second position to alter the size of at least the first display region, the moving of the divider being independent of direct manual manipulation of the divider by a user.

14. The system of claim 13, further comprising a divider support, the divider support supporting the divider, wherein the actuator is coupled to the divider support.

15. The system of claim 13, wherein the actuator comprises a drive motor and a drive shaft.

16. The system of claim 15, wherein the driveshaft is coupled to at least one gear, the at least one gear engaging at least one drive track.

17. The system of claim 16, wherein the at least one drive track comprises a rack gear.

18. The system of claim 15, wherein the drive shaft is connected to a divider support, the divider support supporting the divider.

19. The system of claim 13, wherein the actuator comprises one or more of an electric linear actuator, a linear motor, a hydraulic cylinder, a pneumatic cylinder, an electric motor, an electric cylinder, and a magnetic actuator.

20. The system of claim 13, wherein the divider includes a viewing window therein, the viewing window comprising an area in the divider through which the primary display is visible.

21. The system of claim 13, wherein the divider moves from the first position to the second position through one or more of rotation, translation, angular movement, linear movement, and curvilinear movement.

22. The system of claim 13, wherein the divider includes a secondary display mounted thereon.

23. The system of claim 13, wherein the actuator comprises one or more of an electric linear actuator, a linear motor, a hydraulic cylinder, a pneumatic cylinder, an electric motor, an electric cylinder, and a magnetic actuator.

24. A method of operating a wagering game, comprising:
receiving a wager;
displaying a wagering game on a display, the wagering game comprising a plurality of display elements;
assigning a visual priority to each of the plurality of display elements;
detecting movement from a first position to a second position of a divider overlying the display, the movement occurring in response to a gaming event and the divider moving independent of direct manual manipulation of the divider by a user; and
in response to the movement of the divider, altering the graphical display of at least one of the plurality of display elements based at least in part on the visual priorities assigned to each of the plurality of display elements.

25. The method of claim 24, wherein altering the graphical display comprises at least one of resizing, repositioning, rotating, and relocating the at least one of the plurality of display elements.

26. The method of claim 24, wherein the divider comprises at least one electro-mechanical button.

27. The method of claim 26, wherein at least a portion of the divider is transparent and wherein a portion of the display underlying the divider displays a label associated with a function of the at least one electro-mechanical button.

28. The method of claim 27, wherein in response to the movement of the divider, the label is relocated on the display to be in visual association with the at least one electro-mechanical button.

* * * * *